(12) United States Patent
Aldana (10) Patent No.: US 9,674,814 B2
(45) Date of Patent: Jun. 6, 2017

(54) FAILURE CONDITIONS FOR FINE TIMING MEASUREMENT (FTM) PROTOCOL

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 14/500,047

(22) Filed: Sep. 29, 2014

(65) Prior Publication Data

US 2015/0365913 A1 Dec. 17, 2015

Related U.S. Application Data

(60) Provisional application No. 62/012,826, filed on Jun. 16, 2014.

(51) Int. Cl.
| | | |
|---|---|---|
| H04W 24/08 | (2009.01) | |
| H04L 5/00 | (2006.01) | |
| H04W 64/00 | (2009.01) | |
| G01S 13/82 | (2006.01) | |
| G01S 5/14 | (2006.01) | |

(52) U.S. Cl.
CPC ......... *H04W 64/006* (2013.01); *G01S 13/825* (2013.01); *G01S 5/14* (2013.01)

(58) Field of Classification Search
CPC ....... H04W 64/006; G01S 5/14; G01S 13/825
See application file for complete search history.

(56) References Cited

U.S. PATENT DOCUMENTS

2014/0160959 A1  6/2014  Aldana et al.

FOREIGN PATENT DOCUMENTS

| EP | 1895319 A1 | 3/2008 |
| WO | 2012075052 A1 | 6/2012 |

OTHER PUBLICATIONS

IEEE 802.11-14/0160r0, CID 2164, Jan. 2014.*
International Search Report and Written Opinion—PCT/US2015/024437—ISA/EPO—Jun. 24, 2015. 11 pgs.

\* cited by examiner

*Primary Examiner* — Yemane Mesfin
*Assistant Examiner* — Abdelillah Elmejjarmi
(74) *Attorney, Agent, or Firm* — Hunter Clark PLLC (57) ABSTRACT

Techniques for positioning with Fine Timing Measurement (FTM) messages are disclosed. An example of a wireless transceiver system for providing a FTM response message is configure to receive a FTM request from an initiating station, the FTM request may include a minimum delta FTM value, a number of bursts exponents value, and a As Soon As Possible (ASAP) value. The transceiver may send a first FTM response message indicating the FTM session is terminated if the wireless transceiver is incapable of meeting the minimum delta FTM value and the number of bursts exponents value, and send a second FTM response message including a status value based on the ASAP value in the FTM request if the wireless transceiver is capable of meeting the minimum delta FTM value and the number of bursts exponents value.

30 Claims, 9 Drawing Sheets

| Status Indication Field | | |
|---|---|---|
| Value | Description | Status |
| 0 | Reserved | Reserved |
| 1 | ASAP Capable. Successful. All fields accepted. | Measurement exchanges are about to begin. |
| 2 | Overridden. One or more fields overridden. | Measurement exchanges are about to begin. |
| 3 | Request incapable (do not send same request again). | FTM session ends. |
| 4 | ASAP incapable. Request failed. Do not send new request for [Value] seconds. | FTM session ends. |
| 5 | ASAP incapable. Successful. All non-ASAP fields accepted. | Measurement exchanges are about to begin with ASAP=0. |
| 6 | ASAP capable. Request failed. Do not send new request for [Value] seconds. | FTM session ends. |
| 7 | Reserved | Reserved |

FAILURE CONDITIONS FOR FINE TIMING MEASUREMENT (FTM) PROTOCOL

CROSS-REFERENCE TO RELATED APPLICATIONS

This application claims the benefit of U.S. Provisional Application No. 62/012,826, entitled "Failure Conditions for Fine Timing Measurement (FTM) Protocol," filed on Jun. 16, 2014, which is assigned to the assignee hereof and the contents of which are incorporated herein by reference in their entirety.

BACKGROUND

Embodiments of the inventive subject matter generally relate to the field of wireless communication and, more particularly, to resolving ambiguities in Fine Timing Measurement (FTM) procedures.

Various positioning techniques can be employed for determining the position of a wireless communication device (e.g., a wireless local area network (WLAN) device) based on receiving wireless communication signals. For example, positioning techniques can utilize one or more Fine Timing Measurement (FTM) sessions between a mobile device and one or more access points. The positioning techniques may utilize one or more measurement exchanges to determine time of arrival (TOA), the round trip time (RTT) of wireless communication signals, received signal strength indicator (RSSI), or the time difference of arrival (TDOA) of the wireless communication signals. The RTT, RSSI, TOA, and TDOA information may be used to determine the position of a wireless communication device in a wireless communication network. These factors may be used in conjunction with the known positions of one or more stations in the wireless network to derive the location of the wireless communication device.

SUMMARY

An example of a wireless transceiver system for providing a Fine Timing Measurement (FTM) response message in a FTM session according to the disclosure includes a memory, at least one processor operably coupled to the memory and configure to receive a FTM request from an initiating station, such that the FTM request includes a minimum delta FTM value, a number of bursts exponents value, and a As Soon As Possible (ASAP) value, determine if the wireless transceiver system is capable of meeting the minimum delta FTM value and the number of bursts exponents value, send a first FTM response message indicating the FTM session is terminated if the wireless transceiver is incapable of meeting the minimum delta FTM value and the number of bursts exponents value, and send a second FTM response message including a status value based on the ASAP value in the FTM request if the wireless transceiver is capable of meeting the minimum delta FTM value and the number of bursts exponents value.

Implementations of such a wireless transceiver system may include one or more of the following features. The status value in the second FTM response message may indicate the FTM session is terminated if the ASAP value in the FTM request indicates a false state and the wireless transceiver system is incapable of processing any non-ASAP parameters. The status value in the second FTM response message may indicate that a measurement exchange will begin if the ASAP value in the FTM request indicates a false state and the wireless transceiver system is capable of processing all non-ASAP parameters included in the FTM request. The status value in the second FTM response message may indicate that a measurement exchange will begin if the ASAP value in the FTM request indicates a false state, the wireless transceiver system is incapable of processing all non-ASAP parameters included in the FTM request, and a Go Ahead condition is met. The status value in the second FTM response message may indicate the FTM session is terminated if the ASAP value in the FTM request indicates a true state and the wireless transceiver system is incapable of processing any ASAP parameters. The status value in the second FTM response message may indicate that a measurement exchange will begin if the ASAP value in the FTM request indicates a true state and the wireless transceiver system is capable of processing all ASAP parameters included in the FTM request. The status value in the second FTM response message indicates that a measurement exchange will begin if the ASAP value in the FTM request indicates a true state, the wireless transceiver system is incapable of processing all ASAP parameters included in the FTM request, and a Go Ahead condition is met. The at least one processor may be further configured to determine the minimum delta FTM value, the number of bursts exponents value, and the As Soon As Possible (ASAP) value from the FTM request and may store the respective values in the memory.

An example of a method for providing a Fine Timing Measurement (FTM) response message in a FTM session with a wireless transceiver system according to the disclosure includes receiving a FTM request from an initiating station, such that the FTM request includes a minimum delta FTM value, a number of bursts exponents value, and a As Soon As Possible (ASAP) value, determining if the wireless transceiver system is capable of meeting the minimum delta FTM value and the number of bursts exponents value, sending a first FTM response message indicating the FTM session is terminated if the wireless transceiver system is incapable of meeting the minimum delta FTM value and the number of bursts exponents value, and sending a second FTM response message including a status value based on the ASAP value in the FTM request if the wireless transceiver system is capable of meeting the minimum delta FTM value and the number of bursts exponents value.

Implementations of such a method may include one or more of the following features. The status value in the second FTM response message may indicate the FTM session is terminated if the ASAP value in the FTM request indicates a false state and the wireless transceiver system is incapable of processing any non-ASAP parameters. The status value in the second FTM response message may indicate that a measurement exchange will begin if the ASAP value in the FTM request indicates a false state and the wireless transceiver system is capable of processing all non-ASAP parameters included in the FTM request. The status value in the second FTM response message may indicate that a measurement exchange will begin if the ASAP value in the FTM request indicates a false state, the wireless transceiver system is incapable of processing all non-ASAP parameters included in the FTM request, and a Go Ahead condition is met. The status value in the second FTM response message may indicate the FTM session is terminated if the ASAP value in the FTM request indicates a true state and the wireless transceiver system is incapable of processing any ASAP parameters. The status value in the second FTM response message may indicate that a measurement exchange will begin if the ASAP value in the FTM request indicates a true state and the wireless transceiver system is capable of processing all ASAP parameters included in the FTM request. The status value in the second FTM response message may indicate that a measurement exchange will begin if the ASAP value in the FTM request indicates a true state, the wireless transceiver system is incapable of processing all ASAP parameters included in the FTM request, and a Go Ahead condition is met. The minimum delta FTM value, the number of bursts exponents value, and the As Soon As Possible (ASAP) value from the FTM request may be determined and the respective values stored in a memory.

An example of a non-transitory processor-readable storage medium comprising instructions for providing a Fine Timing Measurement (FTM) response message in a FTM session with a wireless transceiver system according to the disclosure includes code for receiving a FTM request from an initiating station, such that the FTM request includes a minimum delta FTM value, a number of bursts exponents value, and a As Soon As Possible (ASAP) value, code for determining if the wireless transceiver system is capable of meeting the minimum delta FTM value and the number of bursts exponents value, code for sending a first FTM response message indicating the FTM session is terminated if the wireless transceiver system is incapable of meeting the minimum delta FTM value and the number of bursts exponents value, and code for sending a second FTM response message including a status value based on the ASAP value in the FTM request if the wireless transceiver system is capable of meeting the minimum delta FTM value and the number of bursts exponents value.

Implementations of such a non-transitory processor-readable storage medium may include one or more of the following features. The status value in the second FTM response message may indicate the FTM session is terminated if the ASAP value in the FTM request indicates a false state and the wireless transceiver system is incapable of processing any non-ASAP parameters. The status value in the second FTM response message may indicate that a measurement exchange will begin if the ASAP value in the FTM request indicates a false state and the wireless transceiver system is capable of processing all non-ASAP parameters included in the FTM request. The status value in the second FTM response message may indicate that a measurement exchange will begin if the ASAP value in the FTM request indicates a false state, the wireless transceiver system is incapable of processing all non-ASAP parameters included in the FTM request, and a Go Ahead condition is met. The status value in the second FTM response message may indicate the FTM session is terminated if the ASAP value in the FTM request indicates a true state and the wireless transceiver system is incapable of processing any ASAP parameters. The status value in the second FTM response message may indicate that a measurement exchange will begin if the ASAP value in the FTM request indicates a true state and the wireless transceiver system is capable of processing all ASAP parameters included in the FTM request. The status value in the second FTM response message may indicate that a measurement exchange will begin if the ASAP value in the FTM request indicates a true state, the wireless transceiver system is incapable of processing all ASAP parameters included in the FTM request, and a Go Ahead condition is met. The non-transitory processor-readable storage medium may include code for determining the minimum delta FTM value, the number of bursts exponents value, and the As Soon As Possible (ASAP) value from the FTM request and code for storing the respective values in a memory.

An example of an apparatus for providing a Fine Timing Measurement (FTM) response message in a FTM session according to the disclosure includes means for receiving a FTM request from an initiating station, such that the FTM request includes a minimum delta FTM value, a number of bursts exponents value, and a As Soon As Possible (ASAP) value, means for determining if the apparatus is capable of meeting the minimum delta FTM value and the number of bursts exponents value, means for sending a first FTM response message indicating the FTM session is terminated if the apparatus is incapable of meeting the minimum delta FTM value and the number of bursts exponents value, and means for sending a second FTM response message including a status value based on the ASAP value in the FTM request if the apparatus is capable of meeting the minimum delta FTM value and the number of bursts exponents value.

An example of a client station for use in a Fine Timing Measurement (FTM) exchange according to the disclosure includes a memory, at least one processor operably coupled to the memory and configured to generate a FTM request including a minimum delta FTM value, a number of bursts exponents value, and a As Soon As Possible (ASAP) value, send the FTM request to a responding station, receive a first FTM response message from the responding station indicating the FTM session is terminated if the responding station is incapable of meeting the minimum delta FTM value and the number of bursts exponents value, and receive a second FTM response message from the responding station including a status value based on the ASAP value in the FTM request if the responding station is capable of meeting the minimum delta FTM value and the number of bursts exponents value.

Implementations of such a client station may include one or more of the following features. The status value in the second FTM response message may indicate the FTM session is terminated if the ASAP value in the FTM request indicates a false state and the responding station is incapable of processing any non-ASAP parameters. The status value in the second FTM response message may indicate that a measurement exchange will begin if the ASAP value in the FTM request indicates a false state and the responding station is capable of processing all non-ASAP parameters included in the FTM request. The status value in the second FTM response message may indicate that a measurement exchange will begin if the ASAP value in the FTM request indicates a false state, the responding station is incapable of processing all non-ASAP parameters included in the FTM request, and a Go Ahead condition is met. The status value in the second FTM response message may indicate that a measurement exchange will begin if the ASAP value in the FTM request indicates a true state and the responding station is capable of processing all ASAP parameters included in the FTM request. The status value in the second FTM response message may indicate that a measurement exchange will begin if the ASAP value in the FTM request indicates a true state, the responding station is incapable of processing all ASAP parameters included in the FTM request, and a Go Ahead condition is met. The FTM session may be used to determine the position of the client station.

An example of a method for determining a position of a client station according to the disclosure includes generating a Fine Timing Measurement (FTM) request including a minimum delta FTM value, a number of bursts exponents value, and a As Soon As Possible (ASAP) value, sending the FTM request to a responding station, receiving a first FTM response message from the responding station indicating the FTM session is terminated if the responding station is incapable of meeting the minimum delta FTM value and the number of bursts exponents value, receiving a second FTM response message from the responding station including a status value based on the ASAP value in the FTM request if the responding station is capable of meeting the minimum delta FTM value and the number of bursts exponents value, performing one or more FTM exchanges with the responding station based on the second FTM response message, and determining the position of the client station based on the one or more FTM exchanges.

Items and/or techniques described herein may provide one or more of the following capabilities, as well as other capabilities not mentioned. Consistent FTM status fields may be established. Ambiguities in FTM messages may be resolved. FTM message exchange failure cases may be addressed. Capabilities of a station may be transmitted. Messages between incompatible stations may be reduced. Network message traffic may be reduced. Further, it may be possible for an effect noted above to be achieved by means other than that noted, and a noted item/technique may not necessarily yield the noted effect.

DETAILED DESCRIPTION

The description that follows includes exemplary systems, methods, techniques, instruction sequences, and computer program products that embody techniques of the present inventive subject matter. However, it is understood that the described embodiments may be practiced without these specific details. For instance, although examples utilize Fine Timing Measurement (FTM) exchanges for positioning wireless local area network (WLAN) devices, embodiments are not so limited. In other embodiments, the positioning information may be provided by other wireless standards and devices (e.g., WiMAX devices). In other instances, well-known instruction instances, protocols, structures, and techniques have not been shown in detail in order not to obfuscate the description.

In wireless communication networks, determining the position of an electronic device, such as a wireless transceiver system with wireless communication capabilities (e.g., within an indoor or outdoor environment), can be a desired feature for users of the communication device (e.g., station) and operators of the wireless communication network. In some systems, round-trip time (RTT) techniques can be implemented for determining the position of the communication device. For example, the communication device can transmit a request message to a station and can receive a response message from the station. The range between the communication device and the station may be determined by measuring the round trip time between the request messages and the corresponding response messages. The position of the communication device can be determined by comparing the RTT information to the known locations of one or more stations. In some systems, time of arrival (TOA) and/or time difference of arrival (TDOA) techniques may be implemented for determining the position of the communication device. As examples, and not limitations, the processes described in U.S. Pat. No. 8,457,655, titled "Hybrid time of arrival based positioning system," and U.S. Pat. No. 8,521,181, titled "Time of arrival based positioning system" may be used. In general, a communication device may determine its position based on the difference between the ranges from each of the stations to the communication device. Typically, a communication device will initiate RTT, TOA, or TDOA positioning operations by transmitting a FTM request message to one or more stations. A FTM session may be used to determine RTT and/or TDOA timing information associated with the respective access points. A position calculation unit in the communication device may determine the position of the communication device based on RTT and/or TDOA information derived from the FTM session.

A FTM session between an initiating station and a responding station generally begins with a FTM request message sent from the initiating station. The FTM request message may include data fields based on a network standard. For example, the FTM request message may include Fine Timing Measurement Parameters such a described in the IEEE P802.11 standard. The information contained in the FTM request message may then be processed by a responding station to generate a FTM Response message. The FTM Response message is generally referred to as a FTM_1 message. In some circumstances, the capabilities (e.g., configurations) of the initiating station and the responding station are not aligned and a FTM message exchange may not, or should not, occur. For example, some of the parameters in the FTM request may not be compatible with algorithms operating on the responding station. In such a case, the FTM session should be terminated to avoid additional incompatible message traffic from utilizing the available bandwidth. The early termination of FTM sessions may minimize the impact of communication device transmissions on the traffic load of the wireless communication network.

Figure 1A:
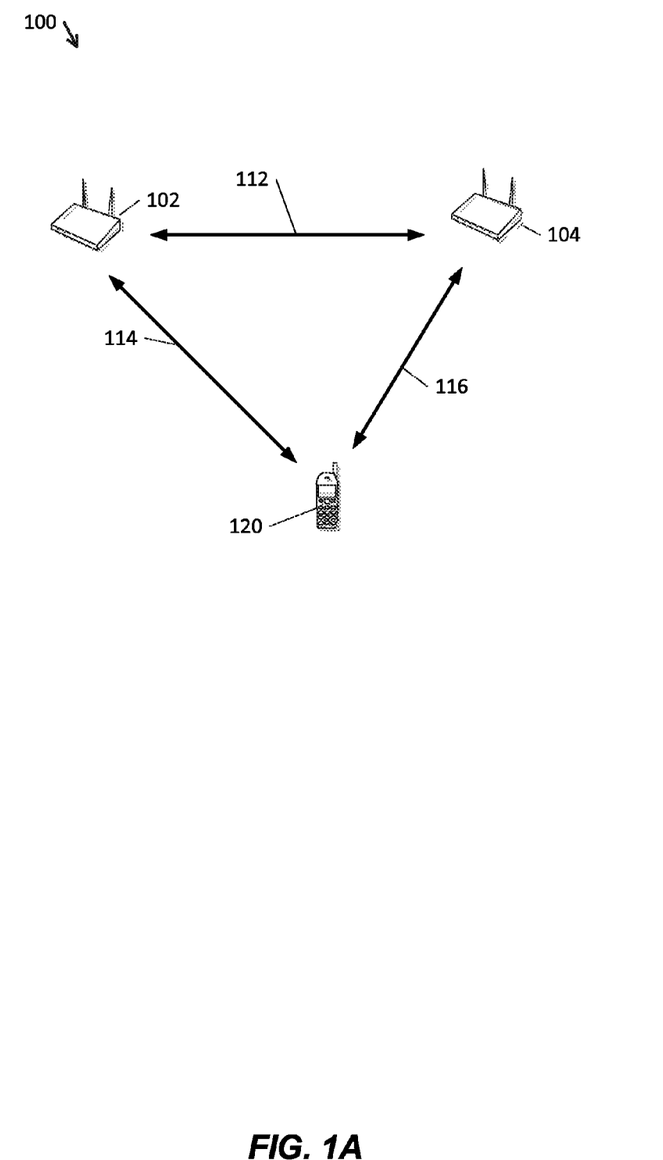
FIG. 1A is an example block diagram of a wireless local area network capable of exchanging FTM messages between stations.

Referring to FIG. 1A, an example block diagram of a wireless local area network capable of exchanging FTM messages between network stations is shown. The network 100 includes three exemplary stations: a first access point 102, a second access point 104, a client station 120. The number of access points and client stations in the network 100 is exemplary only as the techniques provided herein may be used with networks comprising multiple stations. The first access point 102 and the second access point 104 may be an advanced WLAN access points capable of determining their own positions (e.g., a self-locating access point). The access points may be configured to communicate with one or more other access points in the network 100 (e.g., via a first communication path 112). In some implementations, access points can be arranged that one access point can be designated as a master access point, and the other access points can be designated as target access points. The client station 120 can be any suitable electronic device (e.g., a notebook computer, a tablet computer, a netbook, a mobile phone, a gaming console, a personal digital assistant (PDA), inventory tag, etc.) with WLAN communication capabilities. Furthermore, in FIG. 1A, the client station 120 is within the communication range of the first access point 102 (e.g., via a second communication path 114), and the second access point 104 (e.g., via a third communication path 116).

An access point or the client station may initiate a FTM message exchange with another station in the network 100. A FTM message request may conform in part to network standards (e.g., IEEE 802.11). The term "initiating station" is used to describe the station that sends a FTM request message, and the term "responding station" is used to describe the station that responds with a FTM response message (e.g., a FTM_1 message). A FTM exchange may occur between the first access point 102 and the second access point 104, or between the client station 120 and either of access points. The first access point 102, the second access point 104, or the client station 120 may determine position information (e.g., RTT and/or TDOA information) based on a FTM exchange. The access points and/or client station may initiate additional FTM exchanges with other stations in the network 100.

A station in the network 100 may be configured to determine a position based, at least in part, on the information included in a FTM session. In some implementations, a station may use the position information associated with another station (e.g., latitude, longitude, altitude), in combination with the TDOA timing information, and/or the RTT timing information to construct a "positioning equation" in terms of the range between the stations in the network 100. For example, on determining the position information associated with another station, the TDOA timing information, and the RTT timing information associated with three other stations, a station may use three positioning equations to determine its three-dimensional position. In other implementations, the station may determine a position based on network station position information, the TDOA timing information, and the RTT timing information associated with any suitable number of other stations. For example, a position can be based on two independent positioning equations from the station position information, the TDOA timing information, and the RTT timing information associated with two target stations to determine a two-dimensional position of the initiating station.

Figure 1B:
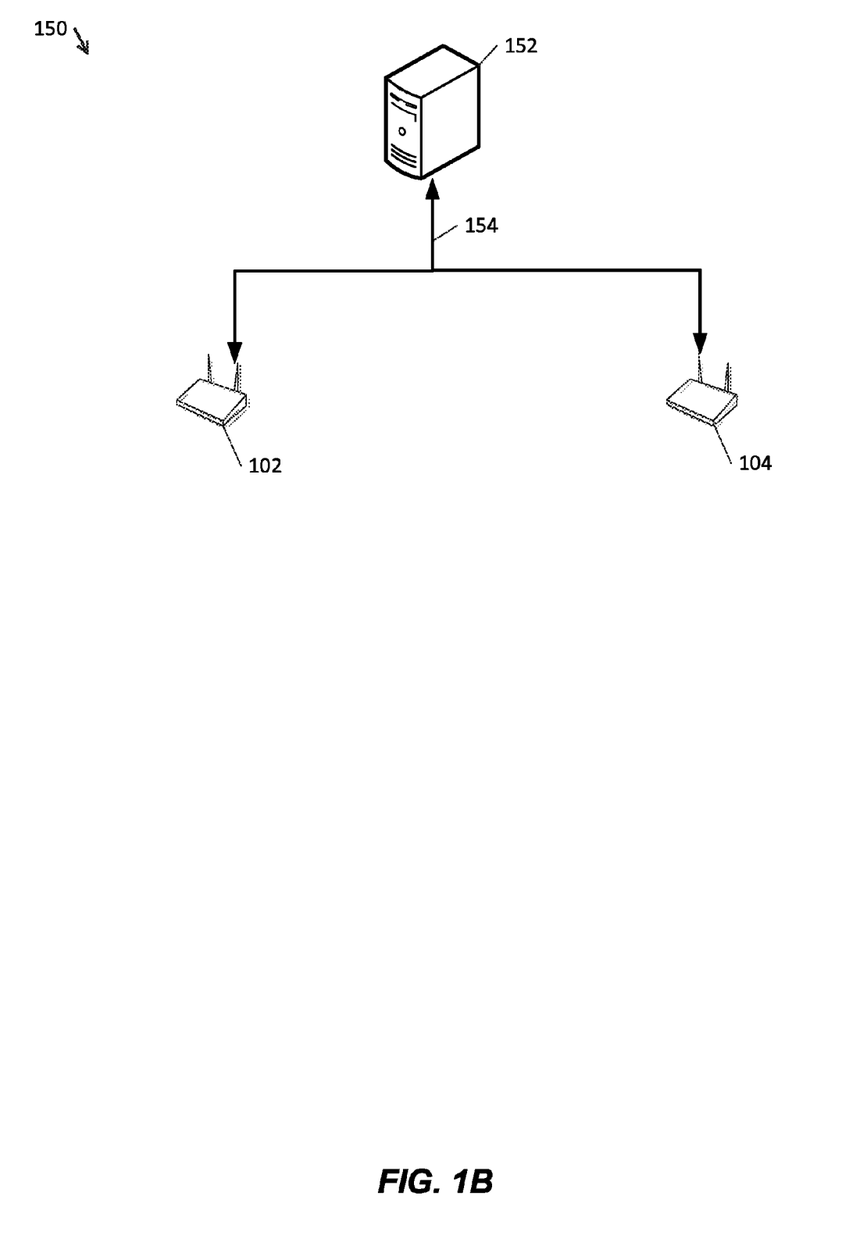
FIG. 1B is an example network diagram of a wireless local area communication network including a position server.

Referring to FIG. 1B, an example network diagram of a wireless local area network including a position server is shown. The network 150 includes the first access point 102, the second access point 104, a position server 152, and a communication path 154. The position server 152 is a computing device including at least one processor and a memory and is configured to execute computer executable instructions. For example, a position server 152 comprises a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 152 stores (e.g., in the memory) processor-readable, processor-executable software code containing instructions for controlling the processor to perform functions described herein. The functions may assist in the implementation FTM message exchanges between network stations (e.g., first access point 102, second access point 104, client station 120). The software can be loaded onto the memory by being downloaded via a network connection, uploaded from a disk, etc. Further, the software may not be directly executable, e.g., requiring compiling before execution. Network stations may be configured to communicate with the position server 152 to exchange FTM and other position information via the communication path 154. The communication path 154 can be a wide area network (WAN) and can include the internet. The position server 152 can include a data structure (e.g., relational database, flat files) to store station position information. For example, the position server 152 can include station position information (e.g., lat./long., x/y), RTT information, SIFS information, and other information associated with a network station (e.g., SSID, MAC address, uncertainty value, coverage area, etc.). A network station may communicate with the position server 152 and may retrieve, for example, station position information, SIFS information and RTT information for use in network station positioning solutions. The configuration of the position server 152 as a remote server is exemplary only, and not a limitation. In an embodiment, the position server 152 may be connected directly to a network station, or the functionality may be included in a network station. More than one position server may be used. The position server 152 may include one or more databases containing position information associated with other stations on additional networks. In an example, the position server 152 is comprised of multiple server units.

Figure 2:
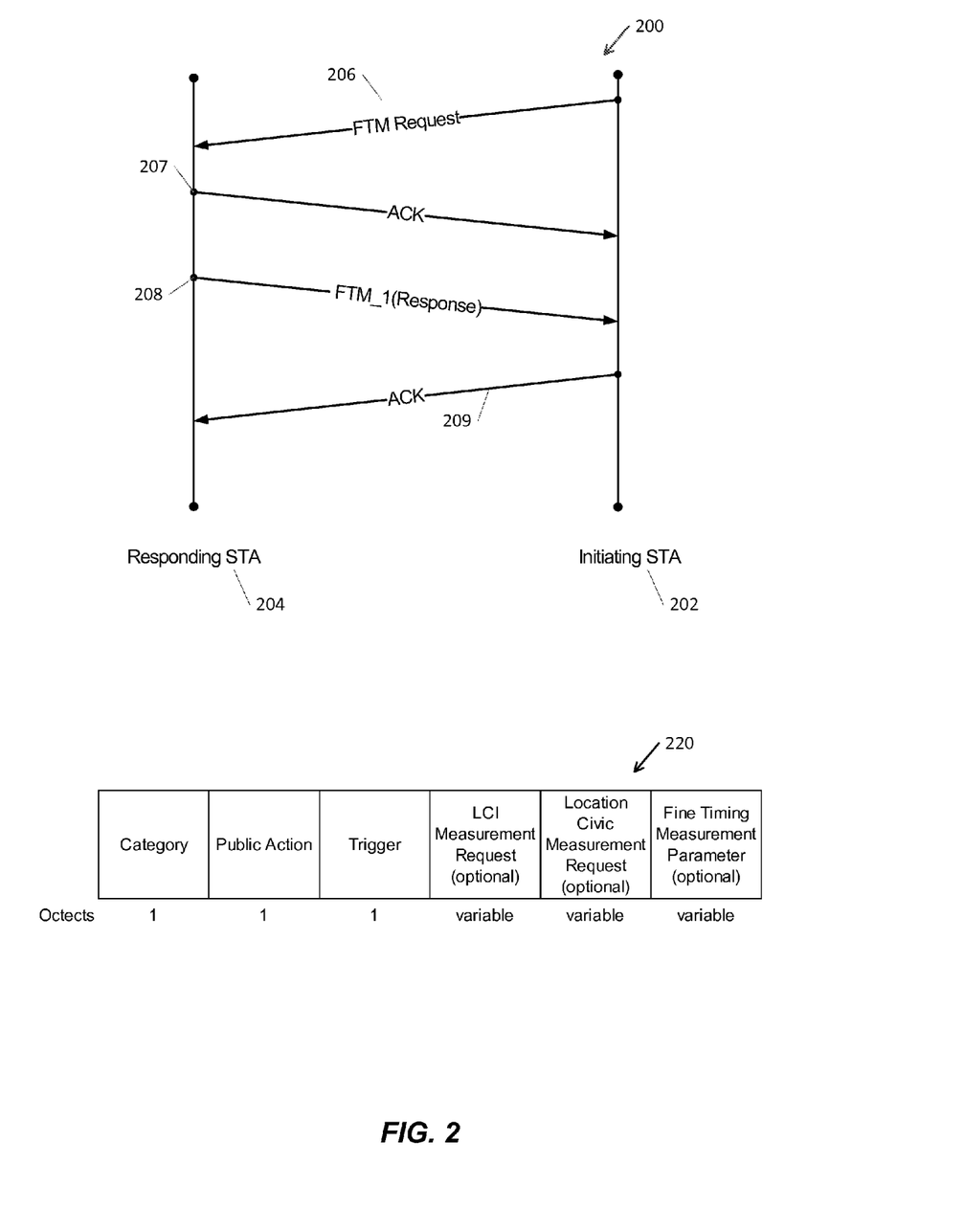
FIG. 2 is a conceptual diagram of a FTM exchange including an exemplary FTM frame format.

Referring to FIG. 2 a conceptual diagram of a FTM exchange including an exemplary FTM frame format is shown. The diagram 200 includes two network stations: an initiating station 202 and a responding station 204. The initiating station 202 and the responding station 204 may be an access point (e.g., 102, 104) or a client station 120 in the network 100. The initiating station 202 sends a FTM Request message 206 to the responding station 204. The responding station 204 may send an acknowledgement (ACK) message 207. The FTM request message 206 may include a FTM frame format 220. The fields in the FTM frame format 220 may be based on a communication protocol (e.g., IEEE P802.11) and may include parameters such as: category, public action, trigger, LCI measurement request, location civic measurement request, and one or more FTM parameters elements. For example, the FTM parameters elements may include an Number of Bursts Exponent value, and Minimum Delta FTM value, and an As Soon As Possible (ASAP) value (e.g., IEEE 802.11, sec. 8.4.2.166). Other parameters may also be included the FTM frame format 220 based on the type/version of the protocol being used by the network stations. The responding station 204 is configured to generate a FTM_1 Response message 208 based on the information included in the received FTM frame format 220. The responding station 204 then sends the FTM_1 Response message 208 to the initiating station 202. The initiating station 202 may acknowledge receipt of the FTM_1 Response message 208 with an acknowledgment (ACK) message 209.

Figure 3:
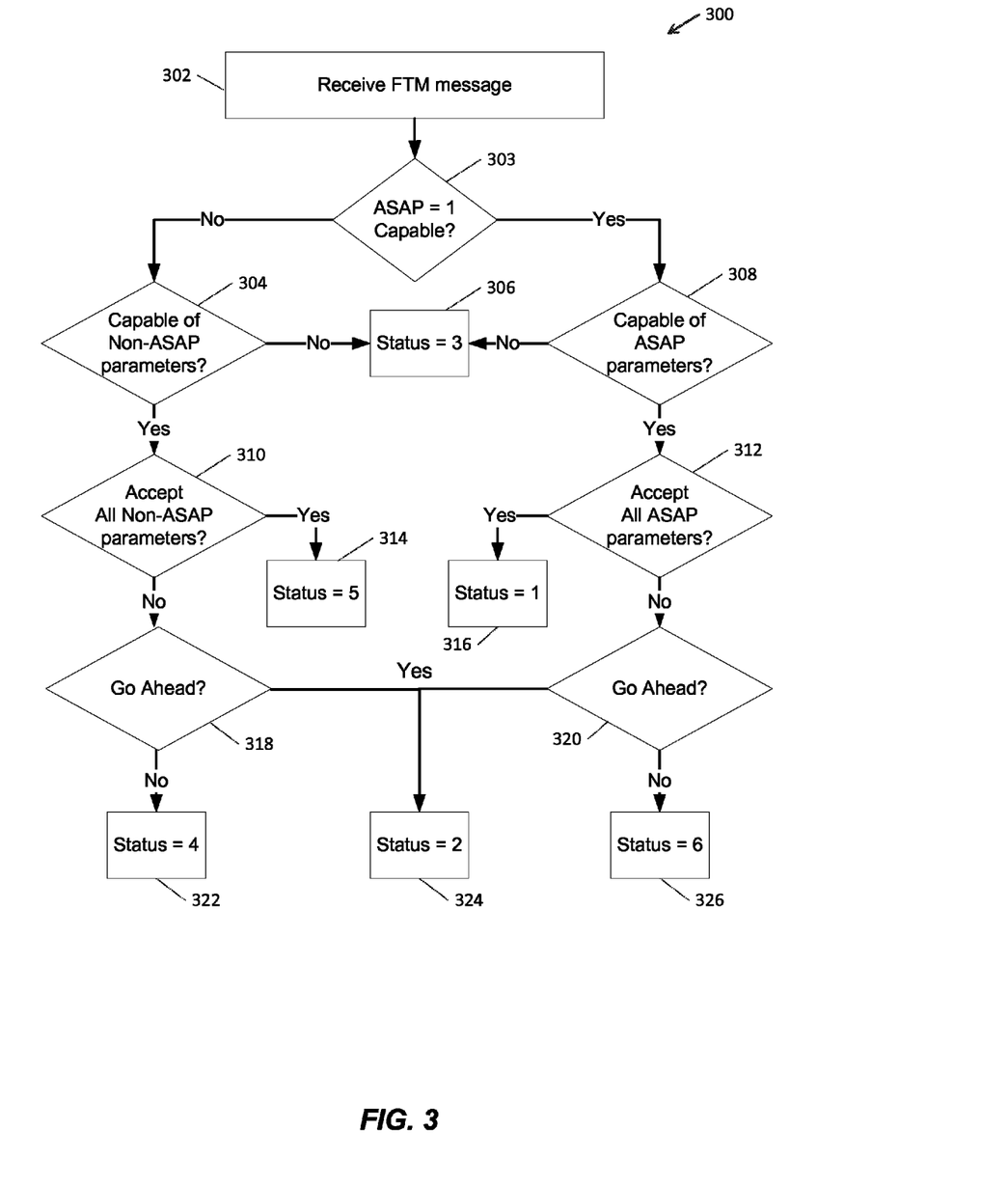
FIG. 3 is a flow diagram for generating a status value based on a received FTM request message.

Referring to FIG. 3, with further references to FIG. 2, a process 300 for generating a status value based on a received FTM request message includes the stages shown. The process 300, however, is exemplary only and not limiting. The process 300 may be altered, e.g., by having stages added, removed, or rearranged. The responding station 204 may be a first access point 102, a second access point 104, or a client station 120.

At stage 302, the responding station 204 is configured to receive the FTM Request message 206, including the parameters indicated in the FTM frame format 220. The initiating station 202 can request the responding station 204 to start a burst instance "as soon as possible" by setting the ASAP field to a value representing a true state (e.g., a value of 1). In general, the ASAP value indicates the initiating station's request to start the first burst instance of the FTM session as soon as possible. The responding station 204 may parse the FTM frame format 220 and determine a value for the ASAP frame element at stage 303. If the ASAP value represents a true state (e.g., equal to 1), then the process proceeds to stage 308. If the ASAP value is not true (i.e., a false state, not equal to 1), then the process proceeds to stage 304.

Figure 5:
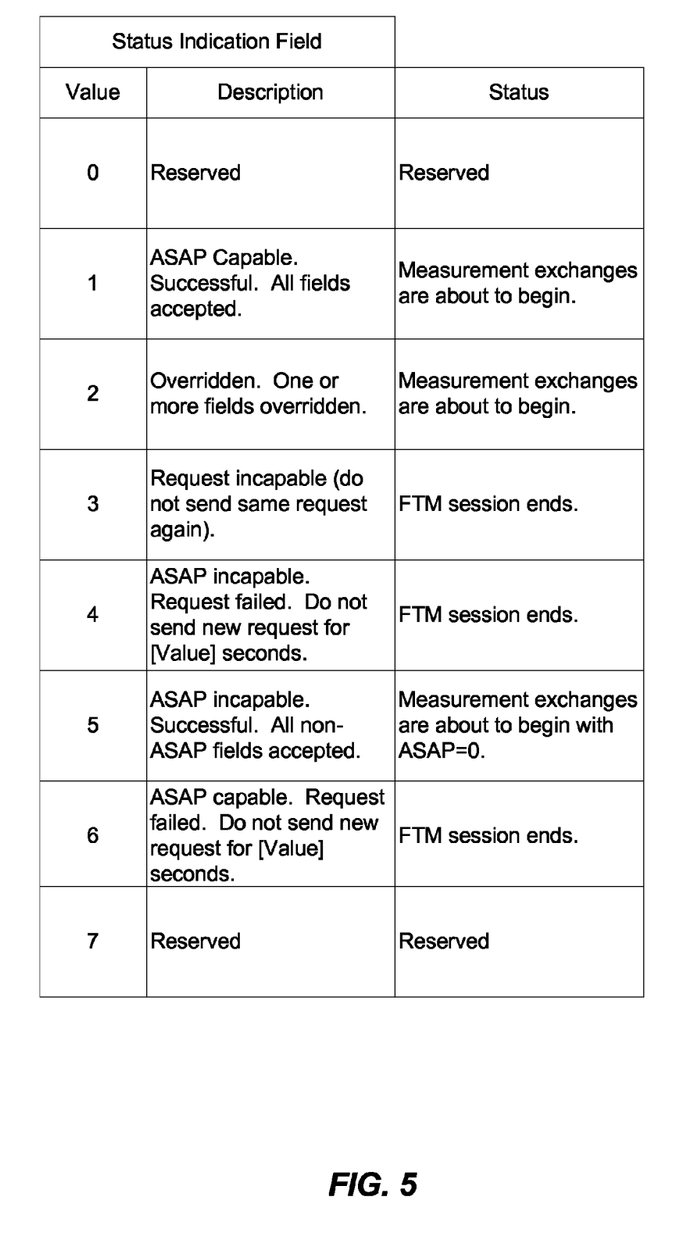
FIG. 5 is a table of exemplary Status Indication field values.

At stages 304 and 308, the responding station 204 is configured to determine if the parameters received in the FTM request message 206 are capable of being processed by the responding station 204. In this context, the term capable means that the responding station 204 is able to fulfill the request by the initiating station 202. If the responding station 204 is not capable of processing the parameters, then a status field in the FTM_1 Response message 208 is set to a value to indicate that the responding station 204 is incapable of responding to the request, and that the requesting station should not send the same request again. Referring to FIG. 5, a collection of values, descriptions and values are shown. The values indicate numbers between 0 and 7. These numbers are exemplary only as any data field (e.g., number, character, string, etc. . . . ) may be used as an index for the corresponding description and status information. Thus, the status value of 3 at stage 306 is exemplary only and is used to indicate that the responding station 204 is incapable of responding to the request, and that the requesting station should not send the same request again. The status value of 3 also indicates a status that ends the FTM session between the initiating station 202 and the responding station 204. If the responding station 204 is capable of processing the parameters, then the process proceeds to stages 310 and 312 respectively.

At stage 310, the responding station 204 is configured to determine if all of the non-ASAP parameters are acceptable values (e.g., within expected ranges). If all of the non-ASAP parameters are accepted, then at stage 314 the status field in the FTM_1 Response message 208 is set to a value to indicate that the responding station 204 is ASAP incapable, all non-ASAP fields are accepted, and measurement exchanges with an ASAP=0 will begin. Referring again to FIG. 5, an exemplary status value of 5 indicates the responding station 204 is ASAP incapable, all non-ASAP fields are accepted, and measurement exchanges with an ASAP=0 will begin. If the responding station 204 does not accept the non-ASAP parameters in the FTM request message 206, then the process proceeds to stage 318.

At stage 312, the responding station 204 is configured to determine if all of the ASAP parameters are acceptable values. If all of the ASAP parameters are accepted, then at stage 316 the status field in the FTM_1 Response message 208 is set to a value indicating that the responding station 204 is ASAP capable, all fields are accepted, and a measurement exchange is about to begin. Referring again to FIG. 5, an exemplary status value of 1 indicates the responding station 204 is ASAP capable, all fields are accepted, and measurement exchange is about to begin. If the responding station 204 does not accept the ASAP parameters in the FTM request message 206, then the process proceeds to stage 320.

At stages 318 and 320, the responding station 204 is configured to determine if a Go Ahead condition is met. In an example, a Go Ahead condition may be an indication (i.e., flag, variable) to indicate that a FTM session will begin (i.e., FTM measurement information will be exchanged). The Go Ahead conditions for each of stage 318 and 320 may be different. If the respective Go Ahead condition is met at either stage 318 or stage 320, the responding station 204 sets the status field in the FTM_1 Response message 208 at stage 324 to a value indicating to the initiating station 202 that one or more fields in the FTM Request message 206 are overridden and measurement exchanges are about to begin. Referring to FIG. 5, a status value of 2 indicates to the initiating station 202 that one or more fields in the FTM Request message 206 are overridden and measurement exchanges are about to begin. If the respective Go Ahead conditions are not met at stage 318 or stage 320, then the status values are set at stage 322 or stage 326 respectively. Referring to FIG. 5, a status value of 4 indicates the responding station 204 is ASAP incapable, the request failed, and the initiating station 202 should not send a new request for some period of time (e.g., a [Value] of seconds, where [Value] is a variable length such as 1, 2, 5, etc. . . . seconds). A status value of 6 indicates the responding station 204 is ASAP capable, the request failed, and the initiating station 202 should not send a new request for some period of time (e.g., a [Value] of seconds). A status value of either 4 or 6 ends the FTM session.

When the initiating station 202 requests ASAP false (e.g., equal to 0), then all status values are possible since the status value depends on whether the responding station 204 is ASAP true (e.g., equal to 1) capable or not. When the initiating station 202 requests ASAP true (e.g., equal to 1), if the responding station 204 is capable of ASAP, then the status should be limited to the status information associated with status values of 1, 2, 3, 6, else if the responding station 204 is not capable of ASAP, then the status should be limited to the status information associated with status values 2, 3, 4, 5.

Figure 4A:
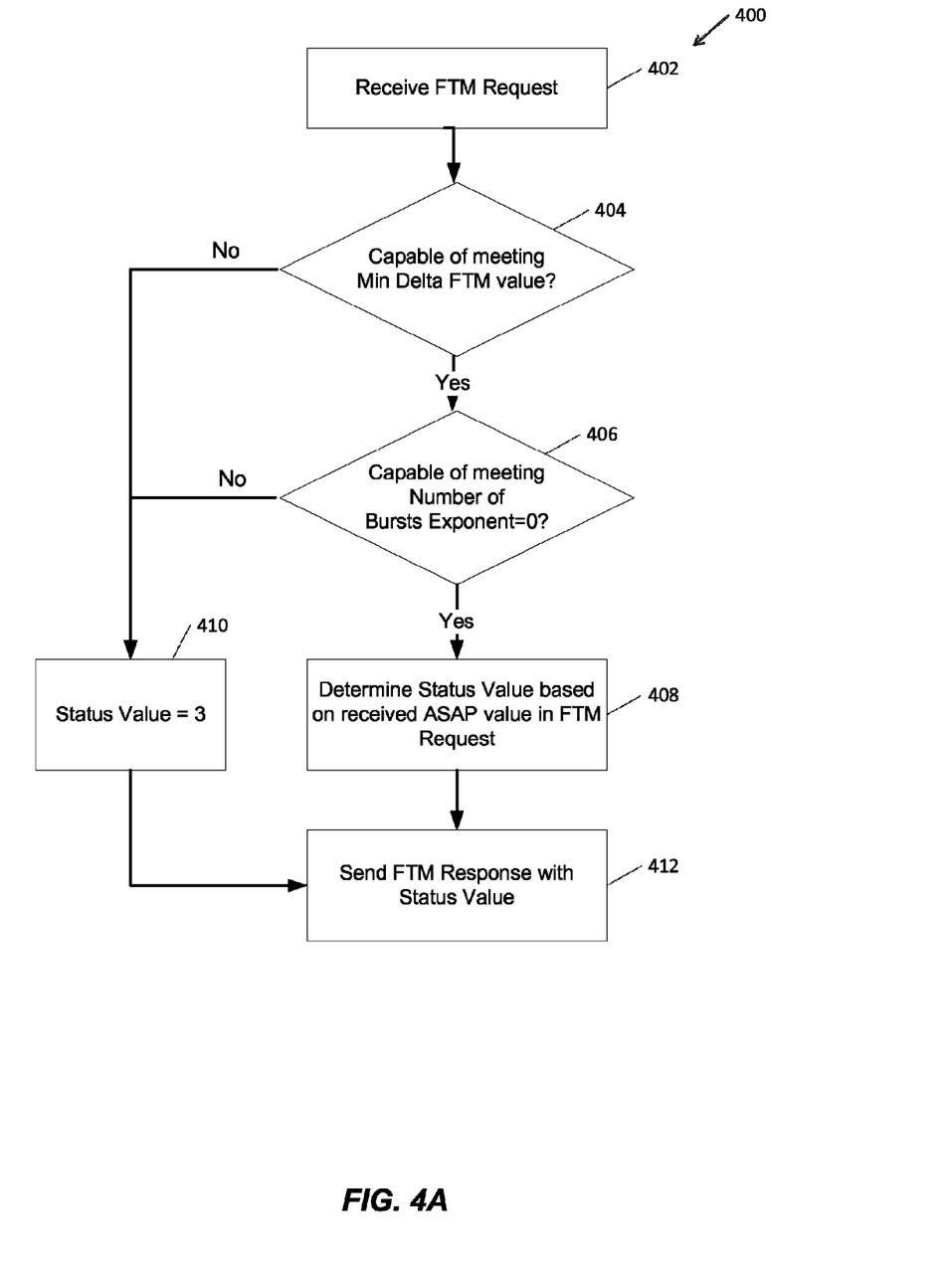
FIG. 4A is a flow diagram for sending a FTM Response with a Status Value.

In operation, referring to FIG. 4A, with further reference to FIGS. 2 and 3, a process 400 for sending a FTM Response with a Status Value includes the stages shown. The process 400, however, is exemplary only and not limiting. The process 400 may be altered, e.g., by having stages added, removed, or rearranged.

At stage 402, the responding station 204 is configured to receive the FTM request message 206 from the initiating station 202. The FTM request message 206 may include a FTM frame format 220. The fields in the FTM frame format 220 may be based on a communication protocol (e.g., IEEE P802.11). Other fields may also be included in the FTM request message 206.

At stages 404 and 406, the responding station 204 is configured to parse the FTM request message 206 and determine values for the minimum delta FTM (Min Delta FTM) and Number of Bursts Exponent respectively. The Min Delta FTM value may indicate the minimum time between consecutive fine timing measurement frames. It may be measured from the start of an FTM frame to the start of the following FTM frame. Units are typically in 100 microseconds. If the Min Delta FTM value in the FTM request message 206 is too large (e.g., greater than 25.5 ms) then at stage 410 the status value in the FTM_1 Response message 208 is set to a value indicating that the responding station 204 is incapable of responding to the request, and that the requesting station should not send the same request. The Number of Bursts Exponent value may indicate how many bursts (2^exponent) are requested/allocated if included in a FTM Request/FTM frame respectively. If the Number of Bursts Exponent equal zero, the status value in the FTM_1 Response message 208 is set at stage 410 to a value indicating that the responding station 204 is incapable of responding to the request, and that the requesting station should not send the same request again. Referring to FIG. 5, an exemplary status value of 3 indicates that the responding station 204 is incapable of responding to the request, and that the requesting station should not send the same request again. The status value of 3 ends the FTM session between the initiating station 202 and the responding station 204. If the Min Delta FTM value is not too large, and the Number of Bursts Exponent=0, then the process continues to stage 408.

At stage 408, the responding station is configured to determine a status value based on a received ASAP value in the FTM request message 206. The status value determined at stage 408 is based on the process 300 described in regards to FIG. 3. At stage 412, the responding station is configured to send the FTM Response message 208 to the initiating station. The FTM Response message may include additional fields such as described in an appropriate network protocol (e.g., IEEE 802.11).

When the responding station 204 is ASAP capable and accepts all the parameters in the FTM request message 206, the responding station 204 shall send a Status Indication field to indicate ASAP capable, successful, and the FTM session continues. When the responding station 204 is ASAP incapable and accepts all of the non-ASAP parameters, then responding station 204 shall send the Status Indication field to indicate ASAP incapable, successful, and the FTM session continues. When the responding station 204 is ASAP capable and is unable to fulfill the FTM session, the responding station 204 shall send the Status Indication filed to indicate ASAP capable, request failed and the FTM session ends. When the responding station 204 is ASAP incapable and is unable to fulfill the FTM session, the responding station 204 shall send the Status Indication field to indicate ASAP incapable, request failed and the FTM session ends. When the responding station 204 is ASAP incapable and is able to fulfill the non-ASAP parameter requests, the responding station 204 shall send the Status Indication field to indicate ASAP incapable, successful, and the FTM session continues. Regardless of the ASAP capability, when the responding station 204 is unable to meet the Min Delta FTM or Number of Bursts Exponent=0 constraints, it shall send the Status indication field to indicate that the request incapable and the FTM session ends.

Figure 4B:
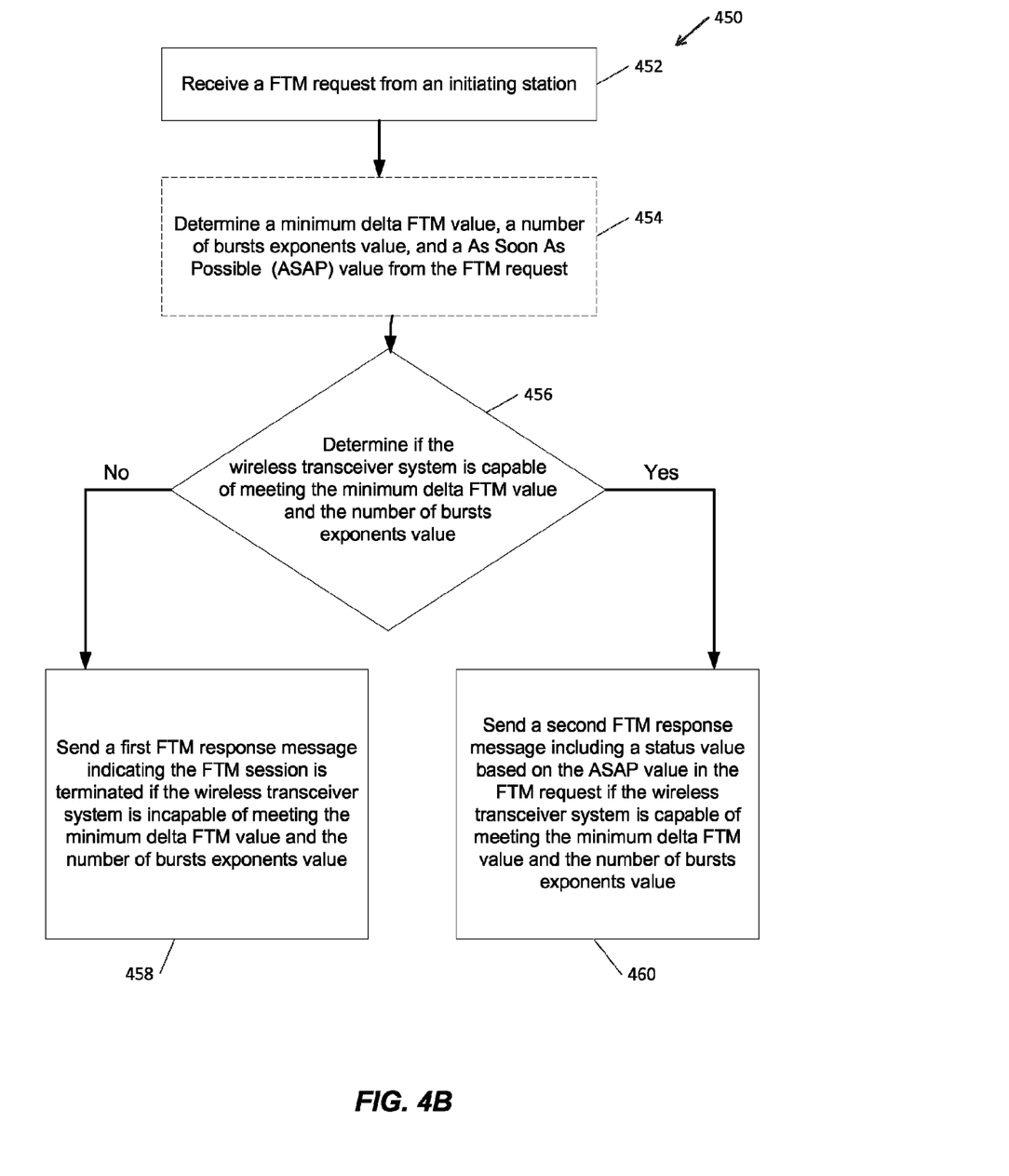
FIG. 4B is a flow diagram for sending a FTM Response from a wireless transceiver system.

In operation, referring to FIG. 4B, with further reference to FIGS. 2, 3 and 4A, a process 450 for sending a FTM Response from a wireless transceiver system includes the stages shown. The process 450, however, is exemplary only and not limiting. The process 450 may be altered, e.g., by having stages added, removed, or rearranged. For example, the determining process of stage 454 is optional. The wireless transceiver system may be an access point, a client device, a mobile station, or other networked system.

At stage 452, the wireless transceiver system is configured to receive a FTM request from an initiating station. The FTM request may be the FTM request message 206 from the initiating station 202 and may include a FTM frame format 220. The fields in the FTM frame format 220 may be based on a communication protocol (e.g., IEEE P802.11). Other fields may also be included in the FTM request message 206. The FTM request may include a minimum delta FTM value, a number of bursts exponents value, and a As Soon As Possible (ASAP) value.

In an embodiment, at optional stage 454, the wireless transceiver system may be configured to determine the minimum delta FTM value, the number of bursts exponents value, and the As Soon As Possible (ASAP) value from the FTM request. For example, the wireless transceiver system may parse the FTM request message 206 and determine the minimum delta FTM value, a number of bursts exponents value, and an ASAP value. The respective values may be stored in a memory device and may be used as variables in functional operations. Determining and storing the values is optional as information within the FTM request may be obtained when required at other stages in the process 450.

At stage 456, the wireless transceiver system may be configured to determine if it is capable of meeting the minimum delta FTM value and the number of bursts exponents value. For example, if the minimum delta FTM value in the received FTM request is too large (e.g., greater than 25.5 ms), then the wireless transceiver system may be incapable of responding to the request. If the number of bursts exponent value equals zero, the wireless transceiver may be incapable of responding to the request. If the wireless transceiver system is incapable of meeting either the minimum delta FTM value, or the number of bursts exponents value, the process continues to stage 458. If the wireless transceiver system is capable of meeting the minimum delta FTM value and the number bursts exponents value, then the process continues to stage 460.

At stage 458, the wireless transceiver system is configured to send a first FTM response message indicating the FTM session is terminated if the wireless transceiver system is incapable of meeting the minimum delta FTM value and the number of bursts exponents value. For example, if the minimum delta value in the received FTM request is too large, a status value in the first FTM Response message may be set to a value indicating that the wireless transceiver system is incapable of responding to the request, and that the requesting station should not send the same request. Similarly, if the number of bursts exponent value equals zero, the status value in the corresponding first FTM Response message may be set to a value indicating that the responding station 204 is incapable of responding to the request, and that the requesting station should not send the same request again. The first FTM response message may be an FTM_1 message and may include additional fields such as described in an appropriate network protocol (e.g., IEEE 802.11).

At stage 460, the wireless transceiver is configured to send a second FTM response message including a status value based on the ASAP value in the FTM request if the wireless transceiver system is capable of meeting the minimum delta FTM value and the number of bursts exponents value. The second FTM response message is an alternative to the first FTM response message described at stage 458. For example, the responding station 204 may utilize the ASAP value determined at optional stage 454 to determine a status value. The status value determined at stage 460 may be based on the process 300 described in regards to FIG. 3. The second FTM response message may be an FTM_1 message and may include additional fields such as described in an appropriate network protocol (e.g., IEEE 802.11).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory processor-readable storage medium, a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6A:
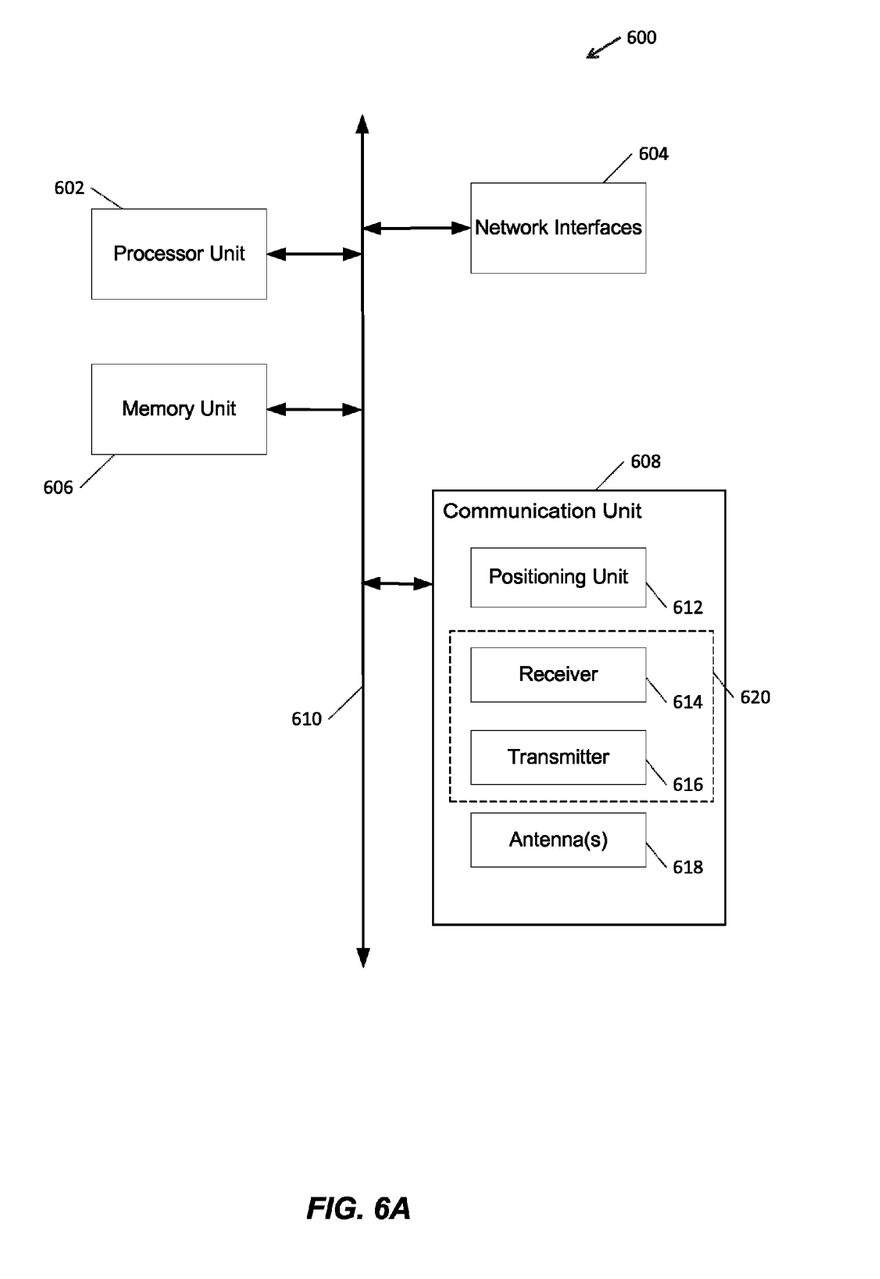
FIG. 6A is a block diagram of a wireless transceiver system for use in generating a FTM Response message.

Referring to FIG. 6A is a block diagram of one embodiment of a wireless transceiver system 600 for use in generating a FTM Response message. In some implementations, the wireless transceiver system 600 may be a station in the network 100, such as the client station 120. In some embodiments, the wireless transceiver system 600 may be the first access point 102 and the second access point 104, or other networked system embodied in a device such as a notebook computer, a tablet computer, a netbook, a mobile phone, a smart phone, a gaming console, a personal digital assistant (PDA), or an inventory tag. The wireless transceiver system 600 may be other electronic systems such as a Home Node B (HNB) device with a wireless transceiver and positioning capabilities (e.g., a type of access point). The wireless transceiver system 600 includes a processor unit 602 (possibly including multiple processors, multiple cores, multiple nodes, and/or implementing multi-threading, etc.). The wireless transceiver system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless transceiver system 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The wireless transceiver system 600 also includes a communication unit 608. The communication unit 608 comprises a positioning unit 612, a receiver 614, a transmitter 616, and one or more antennas 618. The transmitter 616, the antennas 618, and the receiver 614 form a wireless communication module (with the transmitter 616 and the receiver 614 being a transceiver 620). The transmitter 616 and the receiver 614 are configured to communicate bi-directionally with one or more stations via a corresponding antenna 618. In some embodiments, the wireless transceiver system 600 can be configured as a WLAN station with positioning determining capabilities (e.g., a type of access point). The positioning unit 612 can utilize the FTM session information exchanged with the stations to determine RSS, TOA and/or TDOA timing information associated with the access points. The positioning unit 612 can determine the position of the wireless transceiver system 600 based, at least in part, on the TOA/TDOA timing information, and the position information, as described above. In an embodiment, the stations may use their processing capabilities to execute their respective operations described above. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6A (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

Figure 6B:
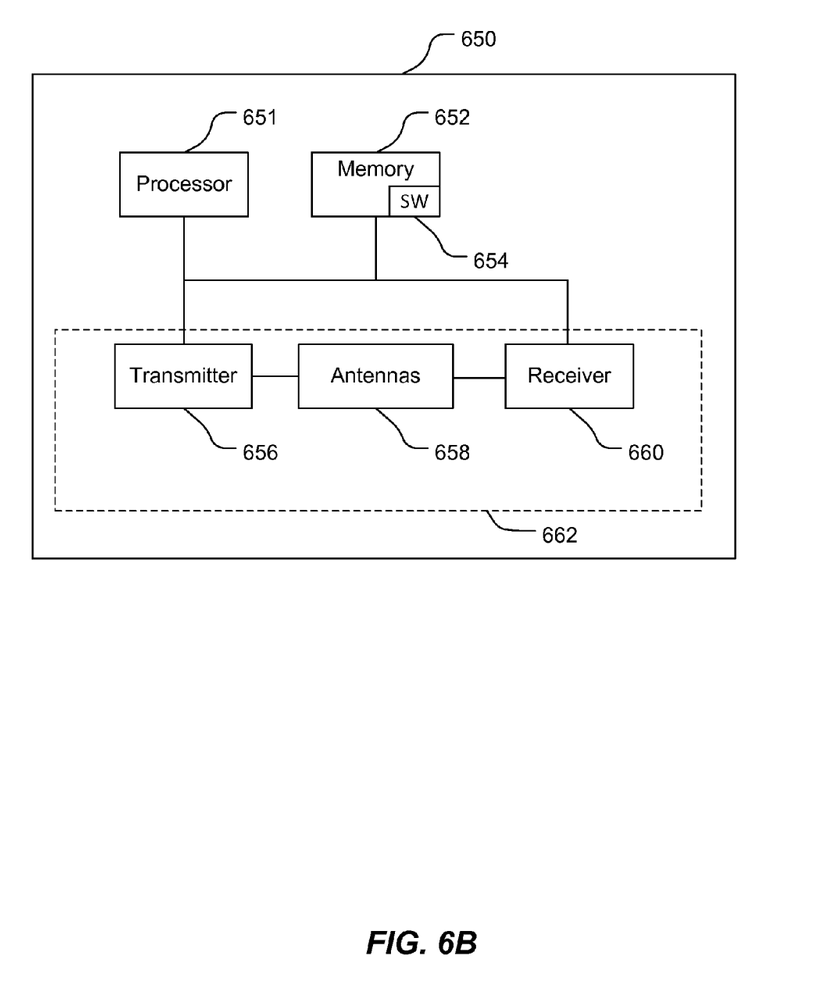
FIG. 6B is a block diagram of an exemplary access point.

Referring to FIG. 6B, an example of a wireless transceiver system such as an access point 650 comprises a computer system including a processor 651, memory 652 including software 654, a transmitter 656, antennas 658, and a receiver 660. The access points 102, 104 may be configured as the access point 650 of FIG. 6B. The transmitter 656, antennas 658, and the receiver 660 form a wireless communication module (with the transmitter 656 and the receiver 660 being a transceiver 662). The transmitter 656 is connected to one of the antennas 658 and the receiver 660 is connected to another of the antennas 658. Other example access points may have different configurations, e.g., with only one antenna 658, and/or with multiple transmitters 656 and/or multiple receivers 660. The transmitter 656 and the receiver 660 are configured such that the access point 650 can communicate bi-directionally with the client station 120 via the antennas 658. The processor 651 is preferably an intelligent hardware device, e.g., a central processing unit (CPU) such as those made by ARM®, Intel® Corporation, or AMD®, a microcontroller, an application specific integrated circuit (ASIC), etc. The processor 651 could comprise multiple separate physical entities that can be distributed in the access point 650. The memory 652 includes random access memory (RAM) and read-only memory (ROM). The memory 652 is a processor-readable storage medium that stores the software 654 which is processor-readable, processor-executable software code containing processor-readable instructions that are configured to, when executed, cause the processor 651 to perform various functions described herein (although the description may refer only to the processor 651 performing the functions). Alternatively, the software 654 may not be directly executable by the processor 651 but configured to cause the processor 651, e.g., when compiled and executed, to perform the functions.

While the embodiments are described with reference to various implementations and exploitations, it will be understood that these embodiments are illustrative and that the scope of the inventive subject matter is not limited to them. In general, techniques for positioning with FTM sessions as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A wireless transceiver system for providing a Fine Timing Measurement (FTM) response message in a FTM session, comprising:
   a memory;
   at least one processor operably coupled to the memory and configure to:
      receive a FTM request from an initiating station, wherein the FTM request includes a minimum delta FTM value to indicate a minimum time between consecutive FTM frames, a number of bursts exponents value to indicate how many bursts are allocated in a FTM frame, and a As Soon As Possible (ASAP) value to indicate that the initiating station requests to start a first burst instance of the FTM session as soon as possible;
      generate a status value to indicate the capabilities of the wireless transceiver to respond to the FTM request based at least in part on the ASAP value, the minimum delta FTM value and the number of bursts exponents value;
      send a first FTM response message with a status field including the status value indicating the FTM session is terminated if the wireless transceiver system is incapable of meeting the minimum delta FTM value and the number of bursts exponents value; and
      send a second FTM response message with the status field including the status value indicating the wireless transceiver system is capable of meeting the ASAP value, the minimum delta FTM value and the number of bursts exponents value.

2. The wireless transceiver system of claim 1, wherein the status value in the second FTM response message indicates the FTM session is terminated if the ASAP value in the FTM request indicates a false state and the wireless transceiver system is incapable of processing any non-ASAP parameters.

3. The wireless transceiver system of claim 1, wherein the status value in the second FTM response message indicates that a fine timing measurement exchange will begin if the ASAP value in the FTM request indicates a false state and the wireless transceiver system is capable of processing all non-ASAP parameters included in the FTM request.

4. The wireless transceiver system of claim 1, wherein the status value in the second FTM response message indicates that a fine timing measurement exchange will begin if the ASAP value in the FTM request indicates a false state, the wireless transceiver system is incapable of processing all non-ASAP parameters included in the FTM request, and a Go Ahead condition is met, wherein the Go Ahead condition is a variable indicating that fine timing measurement information will be exchanged.

5. The wireless transceiver system of claim 1, wherein the status value in the second FTM response message indicates the FTM session is terminated if the ASAP value in the FTM request indicates a true state and the wireless transceiver system is incapable of processing any ASAP parameters.

6. The wireless transceiver system of claim 1, wherein the status value in the second FTM response message indicates that a fine timing measurement exchange will begin if the ASAP value in the FTM request indicates a true state and the wireless transceiver system is capable of processing all ASAP parameters included in the FTM request.

7. The wireless transceiver system of claim 1, wherein the status value in the second FTM response message indicates that a fine timing measurement exchange will begin if the ASAP value in the FTM request indicates a true state, the wireless transceiver system is incapable of processing all ASAP parameters included in the FTM request, and a Go Ahead condition is met, wherein the Go Ahead condition is a variable indicating that fine timing measurement information will be exchanged.

8. The wireless transceiver system of claim 1, wherein the at least one processor is further configured to determine the minimum delta FTM value, the number of bursts exponents value, and the As Soon As Possible (ASAP) value from the FTM request and store the respective values in the memory.

9. A method for providing a Fine Timing Measurement (FTM) response message in a FTM session with a wireless transceiver system, comprising:
   receiving a FTM request from an initiating station, wherein the FTM request includes a minimum delta FTM value to indicate a minimum time between consecutive FTM frames, a number of bursts exponents value to indicate how many bursts are allocated in a FTM frame, and a As Soon As Possible (ASAP) value to indicate that the initiating station requests to start a first burst instance of the FTM session as soon as possible;
generating a status value to indicate the capabilities of the wireless transceiver to respond to the FTM request based at least in part on the ASAP value, the minimum delta FTM value and the number of bursts exponents value;
sending a first FTM response message with a status field including the status value indicating the FTM session is terminated if the wireless transceiver system is incapable of meeting the minimum delta FTM value and the number of bursts exponents value; and
sending a second FTM response message with the status field including the status value indicating the wireless transceiver system is capable of meeting the ASAP value, the minimum delta FTM value and the number of bursts exponents value.

10. The method of claim 9, wherein the status value in the second FTM response message indicates the FTM session is terminated if the ASAP value in the FTM request indicates a false state and the wireless transceiver system is incapable of processing any non-ASAP parameters.

11. The method of claim 9, wherein the status value in the second FTM response message indicates that a fine timing measurement exchange will begin if the ASAP value in the FTM request indicates a false state and the wireless transceiver system is capable of processing all non-ASAP parameters included in the FTM request.

12. The method of claim 9, wherein the status value in the second FTM response message indicates that a fine timing measurement exchange will begin if the ASAP value in the FTM request indicates a false state, the wireless transceiver system is incapable of processing all non-ASAP parameters included in the FTM request, and a Go Ahead condition is met, wherein the Go Ahead condition is a variable indicating that fine timing measurement information will be exchanged.

13. The method of claim 9, wherein the status value in the second FTM response message indicates the FTM session is terminated if the ASAP value in the FTM request indicates a true state and the wireless transceiver system is incapable of processing any ASAP parameters.

14. The method of claim 9, wherein the status value in the second FTM response message indicates that a fine timing measurement exchange will begin if the ASAP value in the FTM request indicates a true state and the wireless transceiver system is capable of processing all ASAP parameters included in the FTM request.

15. The method of claim 9, wherein the status value in the second FTM response message indicates that a fine timing measurement exchange will begin if the ASAP value in the FTM request indicates a true state, the wireless transceiver system is incapable of processing all ASAP parameters included in the FTM request, and a Go Ahead condition is met, wherein the Go Ahead condition is a variable indicating that fine timing measurement information will be exchanged.

16. The method of claim 9, further comprising determining the minimum delta FTM value, the number of bursts exponents value, and the As Soon As Possible (ASAP) value from the FTM request and storing the respective values in a memory.

17. A non-transitory processor-readable storage medium with computer readable program code comprising instructions for providing a Fine Timing Measurement (FTM) response message in a FTM session with a wireless transceiver system, comprising:
code for receiving a FTM request from an initiating station, wherein the FTM request includes a minimum delta FTM value to indicate a minimum time between consecutive FTM frames, a number of bursts exponents value to indicate how many bursts are allocated in a FTM frame, and a As Soon As Possible (ASAP) value to indicate that the initiating station requests to start a first burst instance of the FTM session as soon as possible;
code for generating a status value to indicate the capabilities of the wireless transceiver to respond to the FTM request based at least in part on the ASAP value, the minimum delta FTM value and the number of bursts exponents value;
code for sending a first FTM response message with a status field including the status value indicating the FTM session is terminated if the wireless transceiver system is incapable of meeting the minimum delta FTM value and the number of bursts exponents value; and
code for sending a second FTM response message with the status field including the status value indicating the wireless transceiver system is capable of meeting the ASAP value, the minimum delta FTM value and the number of bursts exponents value.

18. The non-transitory processor-readable storage medium of claim 17, wherein the status value in the second FTM response message indicates the FTM session is terminated if the ASAP value in the FTM request indicates a false state and the wireless transceiver system is incapable of processing any non-ASAP parameters.

19. The non-transitory processor-readable storage medium of claim 17, wherein the status value in the second FTM response message indicates that a fine timing measurement exchange will begin if the ASAP value in the FTM request indicates a false state and the wireless transceiver system is capable of processing all non-ASAP parameters included in the FTM request.

20. The non-transitory processor-readable storage medium of claim 17, wherein the status value in the second FTM response message indicates that a fine timing measurement exchange will begin if the ASAP value in the FTM request indicates a false state, the wireless transceiver system is incapable of processing all non-ASAP parameters included in the FTM request, and a Go Ahead condition is met, wherein the Go Ahead condition is a variable indicating that fine timing measurement information will be exchanged.

21. The non-transitory processor-readable storage medium of claim 17, wherein the status value in the second FTM response message indicates the FTM session is terminated if the ASAP value in the FTM request indicates a true state and the wireless transceiver system is incapable of processing any ASAP parameters.

22. The non-transitory processor-readable storage medium of claim 17, wherein the status value in the second FTM response message indicates that a fine timing measurement exchange will begin if the ASAP value in the FTM request indicates a true state and the wireless transceiver system is capable of processing all ASAP parameters included in the FTM request.

23. The non-transitory processor-readable storage medium of claim 17, wherein the status value in the second FTM response message indicates that a fine timing measurement exchange will begin if the ASAP value in the FTM request indicates a true state, the wireless transceiver system is incapable of processing all ASAP parameters included in the FTM request, and a Go Ahead condition is met, wherein the Go Ahead condition is a variable indicating that fine timing measurement information will be exchanged.

24. The non-transitory processor-readable storage medium of claim 17, further comprising code for determining the minimum delta FTM value, the number of bursts exponents value, and the As Soon As Possible (ASAP) value from the FTM request and code for storing the respective values in a memory.

25. An apparatus for providing a Fine Timing Measurement (FTM) response message in a FTM session, comprising:
   a transceiver configured to receive a FTM request from an initiating station, wherein the FTM request includes a minimum delta FTM value to indicate a minimum time between consecutive FTM frames, a number of bursts exponents value to indicate how many bursts are allocated in a FTM frame, and a As Soon As Possible (ASAP) value to indicate that the initiating station requests to start a first burst instance of the FTM session as soon as possible;
   at least one processor configured to generate a status value to indicate the capabilities of the wireless transceiver to respond to the FTM request based at least in part on the ASAP value, the minimum delta FTM value and the number of bursts exponents value;
   wherein the transceiver is configured to send a first FTM response message with a status field including the status value indicating the FTM session is terminated if the apparatus is incapable of meeting the minimum delta FTM value and the number of bursts exponents value; and
   wherein the transceiver is configured to send a second FTM response message with the status field including the status value indicating the wireless transceiver system is capable of meeting the ASAP value, the minimum delta FTM value and the number of bursts exponents value.

26. The apparatus of claim 25, wherein the status value in the second FTM response message indicates the FTM session is terminated if the ASAP value in the FTM request indicates a false state and the apparatus is incapable of processing any non-ASAP parameters.

27. The apparatus of claim 25, wherein the status value in the second FTM response message indicates that a fine timing measurement exchange will begin if the ASAP value in the FTM request indicates a false state and the apparatus is capable of processing all non-ASAP parameters included in the FTM request.

28. The apparatus of claim 25, wherein the status value in the second FTM response message indicates that a fine timing measurement exchange will begin if the ASAP value in the FTM request indicates a false state, the apparatus is incapable of processing all non-ASAP parameters included in the FTM request, and a Go Ahead condition is met, wherein the Go Ahead condition is a variable indicating that fine timing measurement information will be exchanged.

29. The apparatus of claim 25, wherein the status value in the second FTM response message indicates that a fine timing measurement exchange will begin if the ASAP value in the FTM request indicates a true state and the apparatus is capable of processing all ASAP parameters included in the FTM request.

30. The apparatus of claim 25, wherein the status value in the second FTM response message indicates that a fine timing measurement exchange will begin if the ASAP value in the FTM request indicates a true state, the apparatus is incapable of processing all ASAP parameters included in the FTM request, and a Go Ahead condition is met, wherein the Go Ahead condition is a variable indicating that fine timing measurement information will be exchanged.

* * * * *